(12) United States Patent
Min et al.

(10) Patent No.: US 8,339,926 B2
(45) Date of Patent: Dec. 25, 2012

(54) ELECTRIC FIELD READ/WRITE APPARATUS AND METHOD

(75) Inventors: Dong-ki Min, Seoul (KR); Hoon-sang Oh, Seongnam-si (KR)

(73) Assignee: Seagate Technology LLC, Cupertino, CA (US)

( * ) Notice: Subject to any disclaimer, the term of this patent is extended or adjusted under 35 U.S.C. 154(b) by 72 days.

(21) Appl. No.: 12/489,560

(22) Filed: Jun. 23, 2009

(65) Prior Publication Data

US 2009/0316564 A1    Dec. 24, 2009

(30) Foreign Application Priority Data

Jun. 24, 2008    (KR) .................. 10-2008-0059768

(51) Int. Cl.
  *G11B 9/00*        (2006.01)
(52) U.S. Cl. ........................................ 369/126
(58) Field of Classification Search ............ 369/126
  See application file for complete search history.

(56) References Cited

U.S. PATENT DOCUMENTS

| | | | |
|---|---|---|---|
| 6,477,132 B1 | 11/2002 | Azuma et al. | |
| 7,659,562 B2* | 2/2010 | Ko et al. | 257/288 |
| 7,746,753 B2* | 6/2010 | Min et al. | 369/126 |
| 7,808,025 B2* | 10/2010 | Ko et al. | 257/295 |
| 2007/0196618 A1* | 8/2007 | Nam et al. | 428/64.4 |
| 2010/0284263 A1* | 11/2010 | Cho et al. | 369/126 |

FOREIGN PATENT DOCUMENTS

| | | |
|---|---|---|
| JP | 2004-101440 A | 4/2004 |
| KR | 10-0682956 A | 2/2007 |
| KR | 10-2007-0109776 A | 11/2007 |

* cited by examiner

*Primary Examiner* — Wayne Young
*Assistant Examiner* — Brenda Bernardi
(74) *Attorney, Agent, or Firm* — Hall Estill Attorneys at Law

(57) ABSTRACT

Provided are an electric field read/write apparatus and method, which reproduce information written in a recording medium by using an electric field read/write head including a channel. In the electric field read/write apparatus and method, an electric field generated from the recording medium is modulated by using a modulation signal, a variation in the modulated electric field is detected, and a voltage signal determined according to the detected variation is demodulated and information written in the recording medium is determined according to a result of the demodulation.

18 Claims, 5 Drawing Sheets

ELECTRIC FIELD READ/WRITE APPARATUS AND METHOD

CROSS-REFERENCE TO RELATED PATENT APPLICATION

This application claims priority from Korean Patent Application No. 10-2008-0059768, filed on Jun. 24, 2008 in the Korean Intellectual Property Office, the disclosure of which is incorporated herein in its entirety by reference.

SUMMARY

Apparatuses and methods consistent with this application relate to electric field reading and writing, and more particularly, to an electric field read/write apparatus and method which reproduce information written in a recording medium by an electric field by using an electric field read/write head.

Currently, in most hard disk drives (HDDs) installed in personal computers (PCs), information is recorded by a magnetic field. In such a recording medium, a plurality of magnetic domains, which are magnetized in a first or second direction (i.e., the second direction is opposite to the first direction), are formed on a surface of the recording medium, and information "0" or "1" is recorded in each respective magnetic domain.

Recently, research has been conducted with respect to a recording medium and an electric field read/write head which records and reproduces information by an electric field. Such a recording medium has a plurality of electric domains formed on a surface thereof. These electric domains are magnetized in a first or second direction (i.e., the second direction is opposite to the first direction), and information of "0" or "1" is recorded in a respective electric domain.

The electric field read/write head reproduces the recorded information recorded from these electric domains using an electric field generated from the recording medium.

However, there is always a need for a method of correctly reading out the information recorded in the recording medium, even if an intensity of the electric field generated from the recording medium is weak and there is noise interference in the electric field. The higher is a density of information written in the recording medium, the smaller is an electric domain generated in the recording medium. Thus, an intensity of an electric field generated in the electric domain also becomes weaker. Accordingly, the need for the above-described method increases due to higher integration of the recording medium.

The present invention provides an electric field read/write apparatus, that may be formed on a semiconductor substrate, and a method thereof which may enable more correct reading of information recorded in a recording medium. The electric filed read/write apparatus may have drain and source regions doped with impurities on the semiconductor substrate. In this case, a channel through which a current can flow may be disposed between the drain region and the source region, and then, a resistance of the channel varies according to a polarization direction of an electric domain of a recording medium facing the channel. Thus, the electric field read/write head may detect a resistance of the channel to reproduce information written in an electric domain, and may detect a resistance variation transition (i.e., resistance values based on a time sequence) of the channel to reproduce information written in the recording medium. The resistance of the channel varies according to an electric field generated from the recording medium in which information may be written by an electric field.

The present invention also provides an electric field read/write method in which a resistance of a channel, which varies according to an electric field generated from a recording medium in which information is written by an electric field, can be correctly detected so that the information written in the recording medium can be reproduced.

The present invention also provides a computer readable recording medium for executing a method in which a resistance of a channel, which varies according to an electric field generated from a recording medium in which information is written by an electric field, can be correctly detected so that the information written in the recording medium can be reproduced.

According to an aspect of the present invention, there is provided an electric field read/write apparatus for reproducing information which is written in a recording medium by an electric field, by using an electric field read/write head comprising a channel, the apparatus comprising a modulation unit modulating an electric field generated from the recording medium by using a modulation signal; a detection unit detecting a variation in the modulated electric field; and a demodulation unit demodulating a voltage signal determined according to the detected variation by using the modulation signal, and determining information written in the recording medium according to a result of the demodulation.

According to another aspect of the present invention, there is provided an electric field read/write method of reproducing information which is written in a recording medium by an electric field, by using an electric field read/write head comprising a channel, the method comprising modulating an electric field generated from the recording medium by using a modulation signal; detecting a variation in the modulated electric field; and demodulating a voltage signal determined according to the detected variation by using the modulation signal, and determining information written in the recording medium according to a result of the demodulation.

According to another aspect of the present invention, there is provided a computer readable recording medium having recorded thereon a program for executing the method comprising modulating an electric field generated from the recording medium by using a modulation signal; detecting a variation in the modulated electric field; and demodulating a voltage signal determined according to the detected variation by using the modulation signal, and determining information written in the recording medium according to a result of the demodulation.

BRIEF DESCRIPTION OF THE DRAWINGS

The above and other aspects of the present invention will become more apparent by describing in detail exemplary embodiments thereof with reference to the attached drawings, in which.

DETAILED DESCRIPTION OF EXEMPLARY EMBODIMENTS

Figure 1:
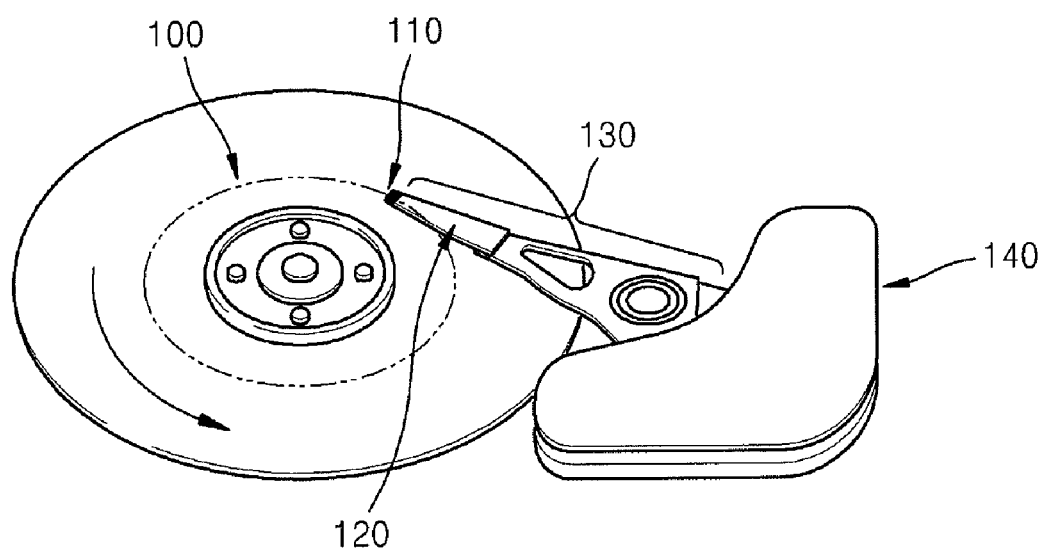
FIG. 1 is a structural view of a recording medium and a header according to an exemplary embodiment.

Exemplary embodiments will now be described more fully with reference to the accompanying drawings. Hereinafter, an electric field according to exemplary embodiments will be described with reference to the attached drawings. Like reference numerals in the drawings denote like elements.

The term "unit", as used herein, indicates, but is not limited to, a software or hardware component, such as a Field Programmable Gate Array (FPGA) or Application Specific Integrated Circuit (ASIC), which performs certain tasks. A unit may advantageously be configured to reside on the addressable storage medium and configured to be executed on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units. In addition, the components and units may be implemented such that they execute one or more computers in a communication system.

FIG. 1 is a structural view of a recording medium 100 and an electric field read/write head 110 according to an exemplary embodiment.

The recording medium 100 may be a ferroelectric recording medium, and may be a structure including a substrate, an electrode and a ferroelectric layer which are sequentially stacked. In this case, the substrate may be formed of Si, glass, etc. The electrode may be formed of a metal such as Pt, Al, Au, Ag, Cu, etc. or metal oxide such as LaCoO, and may be grounded. The ferroelectric layer is formed of a ferroelectric material such as $PbTiO_3$, $PbZrO_3$, etc.

Information is recorded in the recording medium 100 using an electric field. In the recording medium 100, a plurality of electric domains polarized in a first direction or a second direction (here, the first direction is an opposite direction to the second direction) are formed on a surface of the recording medium 100. Information of "0" or "1" is recorded in these electric domains.

The electric field read/write head 110 may read information written to the recording medium 100 or may write information to the recording medium 100 while floating above a surface of the rotating recording medium 100 with a given space therebetween.

The electric field read/write head 110 is attached to a head suspension 120. The head suspension 120 is disposed at a tip of a swing arm 130. The swing arm 130 is moved by a voice coil motor 140. By virtue of the rotation of the swing arm 130, the electric field read/write head 110 can be positioned over a desired location of the recording medium 100.

Figure 2A:
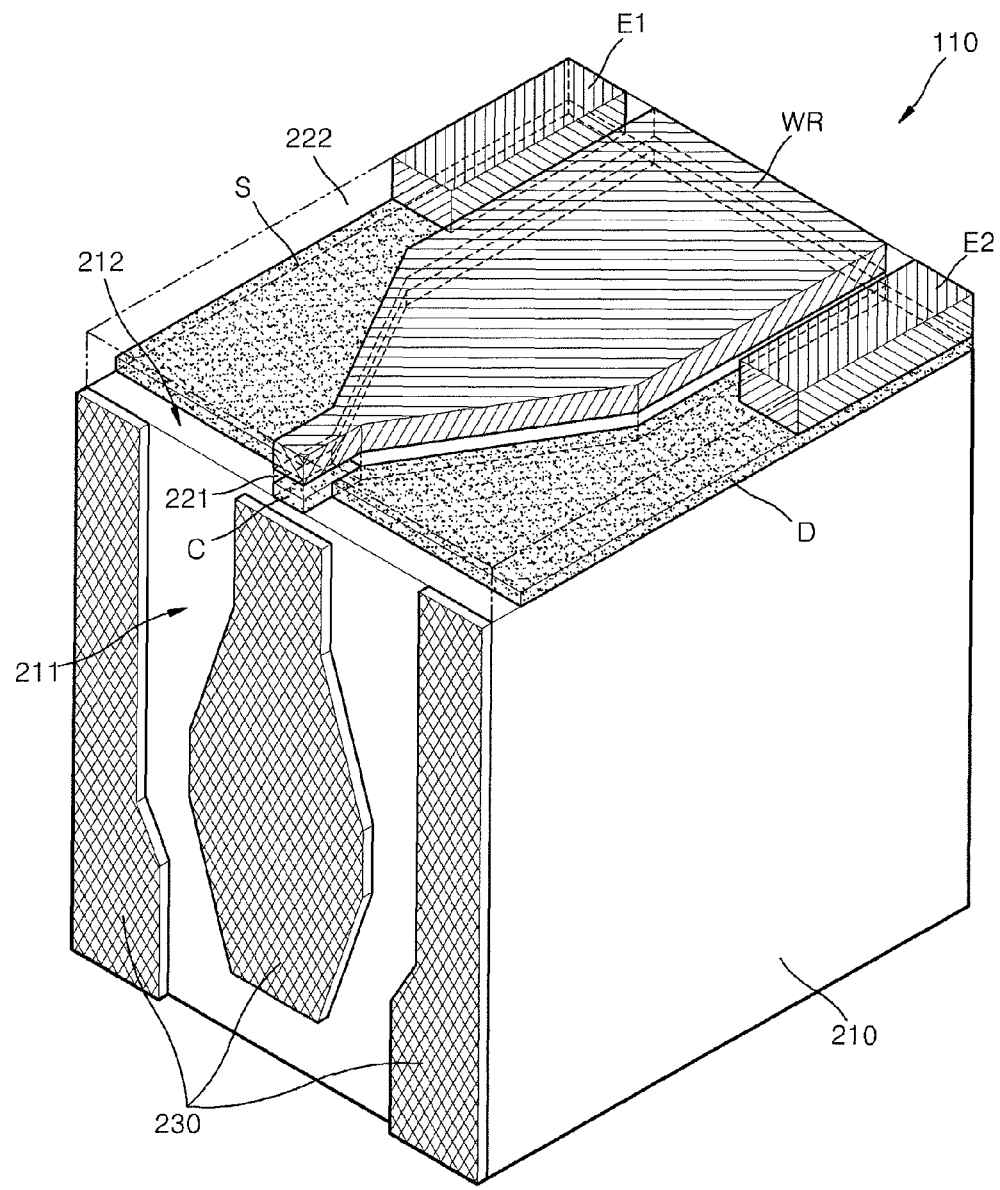
FIG. 2A is a perspective view of an electric field read/write head illustrated in FIG. 1, according to an exemplary embodiment.
Figure 2B:
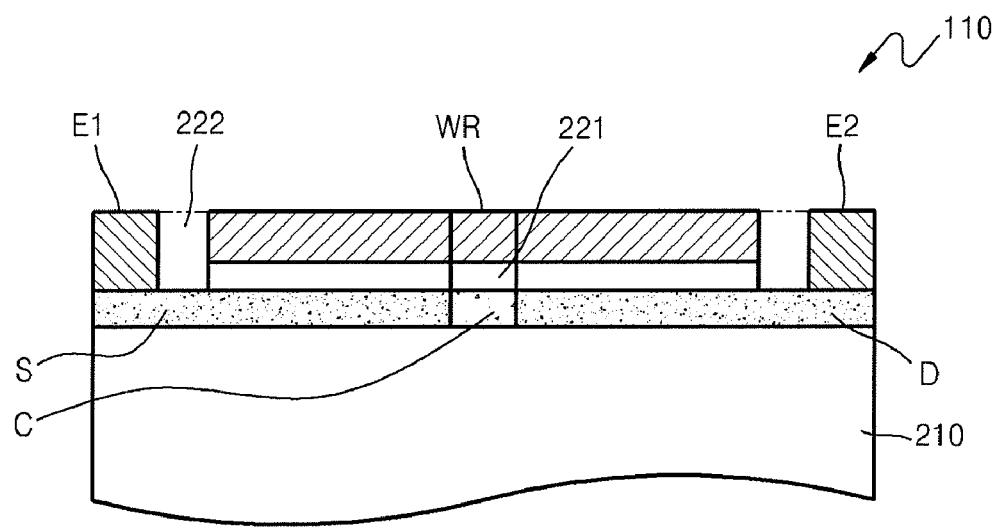
FIG. 2B is a front view of the electric field read/write head illustrated in FIG. 1, according to an exemplary embodiment.

FIG. 2A is a perspective view of the electric field read/write head 110 illustrated in FIG. 1, according to an exemplary embodiment. FIG. 2B is a front view of the electric field read/write head 110 illustrated in FIG. 1, according to the exemplary embodiment.

Referring to FIGS. 2A and 2B, the electric field read/write head 110 is embodied on a semiconductor substrate 210 formed of a p-type or n-type semiconductor material. The semiconductor substrate 210 includes a first surface 211 facing the recording medium 100 and a second surface 212 abutting the first surface 211. The first surface 211 and the second surface 212 may be perpendicular to each other.

An air bearing surface (ABS) pattern 230 may be formed on the first surface 211 of the semiconductor substrate 210. The ABS pattern 230 functions such that the electric field read/write head 110 may float above a surface of the recording medium 100.

A channel C that is a low concentration impurity region and a source region S and a drain region D that are high concentration impurity regions are formed on the semiconductor substrate 210. The source region S and the drain region D are disposed on opposite sides of the channel C. A source electrode E1 is electrically connected to the source region S. A drain electrode E2 is electrically connected to the drain region D. When the semiconductor substrate 210 is formed of a p-type semiconductor, the channel C is an n− impurity region, and the source region S and the drain region D are n+ impurity regions. On the other hand, when the semiconductor substrate 210 is formed of an n-type semiconductor, the channel C is a p− impurity region, and the source region S and the drain region D are p+ impurity regions. A first insulating layer 221 is disposed on the channel C. A writing electrode WR is disposed on the first insulating layer 221. A second insulating layer 222 is disposed on an exposed portion of the source region S and an exposed portion of the drain region D.

The channel C provides a path through which a current flows between the source region S and the drain region D. A resistance of the channel C varies according to at least one of a polarization direction and an electric charge of an electric domain facing the channel C. The electric field read/write head 110 detects the resistance of the channel C to read information written in the electric domain facing the channel C.

Thus, a writing operation of the electric field read/write head 110 will be described for reference. When a positive voltage (+) or negative voltage (−) whose absolute value is equal to or greater than a threshold voltage is applied to the writing electrode WR of the electric field read/write head 110, particular information of "0" or "1" is recorded in the electric domain facing the channel C. For example, when a positive (+) voltage equal to or greater than the threshold voltage is applied to the writing electrode WR, the electric domain facing the channel C is polarized in a first direction, and thus information of "0" is recoded in the electric domain. In addition, when a negative (−) voltage whose absolute value is equal to or greater than the threshold voltage is applied to the writing electrode WR, the electric domain facing the channel C is polarized in a second direction, and thus information of "1" is recorded in the electric domain.

Figure 3:
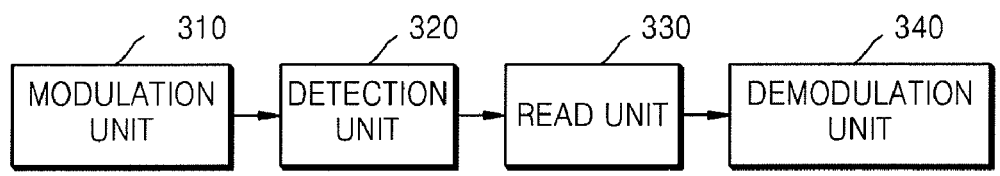
FIG. 3 is a block diagram of an electric field read/write apparatus according to an exemplary embodiment.

FIG. 3 is a block diagram of an electric field read/write apparatus according to an exemplary embodiment. The electric field read/write apparatus according to the present exemplary embodiment may include a modulation unit 310, a detection unit 320, a read unit 330 and a demodulation unit 340. In this case, the modulation unit 310, the read unit 330 and the demodulation unit 340 may be provided outside of the electric field read/write head 110 illustrated in FIG. 1, and the detection unit 320 may be disposed inside of the electric field read/write head 110 illustrated in FIG. 1.

The modulation unit 310 modulates an electric field generated from the recording medium 100 by using a modulation signal. Since the recording medium 100 operates while data is being read, the electric domain facing the channel C of the electric field read/write head 110 continuously varies. Thus, the modulation unit 310 modulates an electric field variation transition (i.e., an electric field value based on a time sequence) of the electric field which is generated from the electric domain facing the channel C of the electric field read/write head 110 by using the modulation signal. The modulation signal has a given frequency, and is applied to the writing electrode WR of the electric field read/write head 110. The size of the modulation signal may be less than a threshold voltage.

The detection unit 320 detects the electric field variation (more specifically, the electric field variation transition), which is modulated by the modulation unit 310. In particular, the detection unit 320 detects a resistance variation (more specifically, a resistance variation transition) of the channel C occurring due to the electric field modulated by the modulation unit 310.

The read unit 330 outputs a voltage signal determined according to the electric field variation (more specifically, the electric field variation transition), which is detected by the detection unit 320. The read unit 330 is embodied by a plurality of circuitry devices (e.g., a resistor and an amplifier) including the electric field read/write head 110. In addition, the read unit 330 receives a given voltage to output a voltage signal determined according to the electric field variation detected by the detection unit 320. In this case, the circuit devices constituting the read unit 330 may be arranged according to a given design. Thus, the read unit 330 outputs the voltage signal determined according to the electric field variation (more specifically, the electric field variation transition) detected by the detection unit 320 by using a given method.

The demodulation unit 340 demodulates the voltage signal input from the read unit 330 by using the modulation signal used by the modulation unit 310 to generate the electric field from the recording medium 100. According to a demodulation result, the demodulation unit 340 determines information written in the recording medium 100.

The demodulation unit 340 demodulates the voltage signal input from the read unit 330 by using the modulation signal, performs low pass filtering (LPF) with a filter coefficient with respect to the demodulation result, and then determines the information written in the recording medium 100 according to an LPF result. At this time, by performing the LPF with respect to the demodulation result, the demodulation unit 340 may extract only a direct current (DC) component from the LPF result to determine the information written in the recording medium 100 according to the extracted DC component.

The demodulation unit 340 may remove an offset contained in the demodulation result, and may determine the information written in the recording medium 100 according to the demodulation result from which the offset is removed.

In short, the information written in the recording medium 100 is reproduced by detecting a resistance variation of the channel C of the electric field read/write head 110 floating above a surface of the recording medium 100.

A resistance of a resistor can be determined by a voltage or a current of a circuit including the resistor. In this regard, when a voltage signal (or, a current signal) having information regarding a resistance of a resistor is obtained, noise in the circuit may interfere with the voltage signal. Thus, when a voltage signal at a given point of a circuit including a resistor is obtained in order to correctly determine a resistance of the resistor, as much noise as possible in the circuit must be prevented from interfering with the voltage signal.

Accordingly, in order to correctly reproduce the information written in the recording medium 100, a resistance variation of the channel C, dependent on an electric field generated in the recording medium 100, needs to be correctly detected. To achieve this, a voltage signal (or, a current signal) of a circuit including the channel C, which has information regarding the resistance variation of the channel C, needs to be correctly obtained so that as much noise as possible in the circuit can be prevented from interfering with the voltage signal.

According to the present exemplary embodiment, the electric field read/write apparatus according to the present exemplary embodiment does not simply use a voltage signal containing information regarding a resistance variation of the channel C occurring due to an electric field generated in the recording medium 100, in order to reproduce information recorded in the recording medium. Instead, in the present exemplary embodiment, the electric field is first modulated by a modulation signal. Next, a voltage signal containing information regarding a resistance variation of the channel C occurring due to a modulation result is demodulated using the modulation signal, and then information written in the recording medium 100 is reproduced according to a demodulation result. A frequency of the modulation signal is much higher than that of the electric field generated in the recording medium 100, and accordingly, the modulated electric field is nearly completely unaffected by noise. Thus, according to the present exemplary embodiment, since the voltage signal containing information regarding the resistance variation of the channel C occurring due to the electric field modulated by the modulation signal is obtained as a voltage signal that is nearly completely unaffected by the noise in a circuit constituting the read unit 330, the information written in the recording medium 100 may be correctly reproduced.

Figure 4:
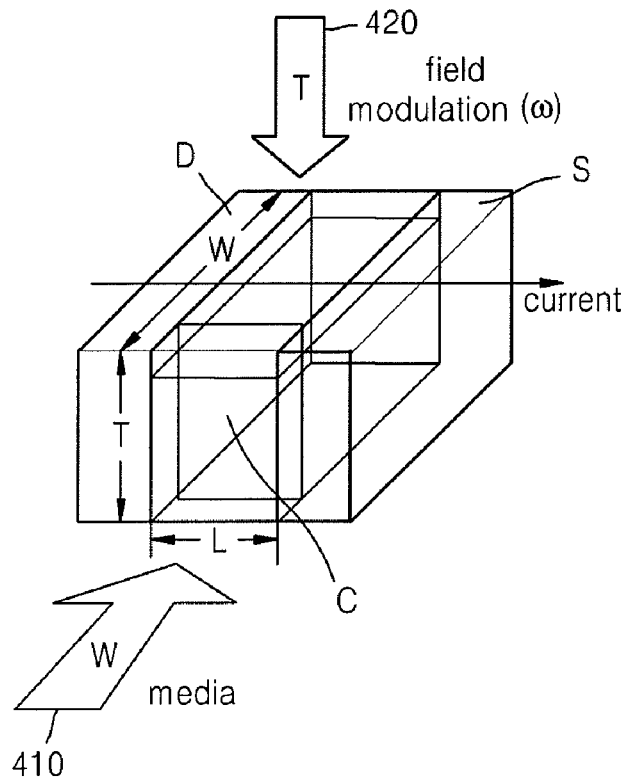
FIG. 4 is a reference view illustrating an operation of a modulation unit illustrated in FIG. 3, according to an exemplary embodiment.

FIG. 4 is a reference view illustrating an operation of the modulation unit 310 illustrated in FIG. 3, according to an exemplary embodiment. FIG. 4 illustrates a source region S, a drain region D and a channel C of the electric field read/write head 110 illustrated in FIG. 1. Referring to FIG. 4, a current may flow from the drain region D to the source region S through the channel C having width W, thickness T and length L.

The width W of the channel C is determined according to an electric field 410 generated from the recording medium 100. Accordingly, a resistance of the channel C is determined according to the electric field 410 generated in the recording medium 100.

Similarly, since a writing electrode WR is disposed above the first insulating layer 221 disposed above the channel C, the thickness T of the channel C is determined by the modulation signal 420 applied to the writing electrode WR. That is, the resistance of the channel C is affected by the modulation signal 420.

Thus, the resistance of the channel C is given by Equation 1 as follows.

$$r_F = \rho \frac{L}{A} = \rho \frac{L}{(W-w)(T-t)} \qquad (1)$$

$$\approx \rho \frac{L}{WT}\left(1 + \frac{w}{W} + \frac{t}{T} - \frac{w^2}{W^2} - \frac{wt}{WT} - \frac{t^2}{T^2}\right),$$

where $r_F$ is the resistance of the channel C, $\rho$ is the resistivity of the channel C, A is a cross section of the channel C, L is the length of the channel C, W is the width of the channel C, T is the thickness of the channel C, w is the variation in width of the channel C occurring with respect to change in carrier distribution in the channel C due to an electric field generated in the recording medium 100, and t is the variation in thickness of the channel C occurring with respect to carrier distribution in the channel C due to a modulation signal.

When only a component $r_\omega$ having a frequency ω of the modulation signal is extracted from among components of $r_F$ of Equation 1, the component $r_\omega$ can be given by Equation 2.

$$r_\omega = \rho \frac{L}{WT}\left(1 - \frac{w}{W}\right)\frac{t}{T} \quad (2)$$

Figure 5:
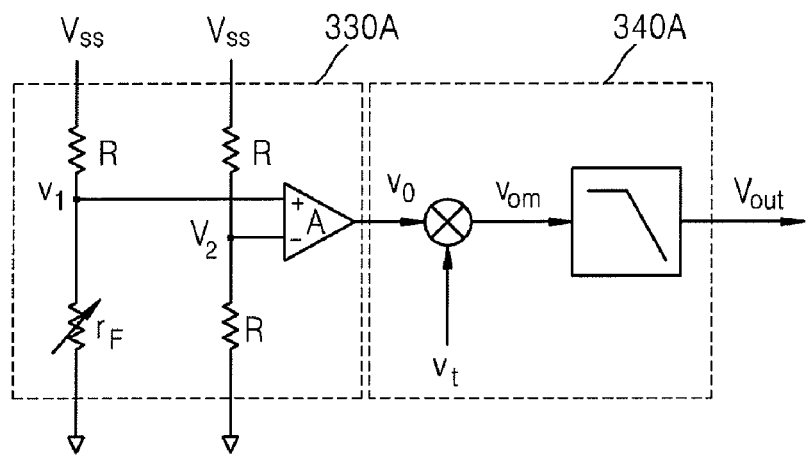
FIG. 5 is a circuit diagram of a modified version of a read unit and a demodulation unit illustrated in FIG. 3, according to an exemplary embodiment.

FIG. 5 is a circuit diagram of a modified version of the read unit 330 and the demodulation unit 340 illustrated in FIG. 3, according to an exemplary embodiment.

Referring to FIG. 5, a read unit 330A includes a wheatstone bridge circuit and an instrumentation amplifier. The instrumentation amplifier may be implemented using a plurality of ideal operational amplifiers (OP AMPs) to perform a given operation. In FIG. 5, $r_F$ is a resistance of the channel C, $V_{SS}$ is a given voltage input to the read unit 330A, R is a resistance, $v_1$ is a voltage of a non-inverting terminal of the instrumentation amplifier, and $v_2$ is a voltage of an inverting terminal of the instrumentation amplifier. The instrumentation amplifier amplifies and outputs $v_o$, which is A (A is a positive integer) times a difference between v1 and v2. At this time, $v_o$ represents the voltage signal determined according to the electric field variation (more specifically, the electric field variation transition) detected by the detection unit 320 as described above.

As illustrated in FIG. 5, a demodulation unit 340A demodulates $v_o$ by using a modulation signal $v_t$, performs LPF with respect to a demodulation result $v_{om}$, and determines information written in the recording medium 100 according to a result $v_{out}$ of the LPF.

In particular, $v_1$, $v_2$, $v_o$, $v_{om}$ and $v_{out}$, as illustrated in FIG. 5, are each given by Equation 3 as follows.

$$v_1 = \frac{r_F}{P_t + r_F}V_{ss} \quad (3)$$

$$v_2 = \frac{1}{2}V_{ss}$$

$$v_0 = A(v_1 - v_2) = \frac{1}{2}\frac{r_F - P_t}{P_t + r_F}V_{ss}A$$

$$v_{om} = \frac{1}{2}\frac{r_F - P_t}{P_t + r_F}V_{ss}Av_t$$

$$\approx \frac{V_{ss}}{2(P_t + r_0)}[r_0 - P_t + r_\omega + r_{2\omega}]Av_t,$$

where $r_o$ is a DC component of $r_F$, $r_{2\omega}$ is a component having a frequency 2ω that is twice the frequency ω of the modulation signal, extracted from among the components of $r_F$. In components of $v_{om}$, $(r_o*v_t)$ has only a component of ω, $(R*v_t)$ has only a component of ω, $(r_\omega*v_t)$ has only a DC component and a component of 2ω, and a DC component of $(r_{2\omega}*v_t)$ has only components of ω and 3ω.

Thus, the demodulation unit 340A may perform LPF with respect to the demodulation result $v_{om}$ to extract only a DC component from the demodulation result $v_{om}$. That is, the demodulation unit 340A may perform LPF with respect to the demodulation result $v_{om}$ to obtain only information regarding $(r_\omega*v_t)$ from among information regarding $(r_o*v_t)$, $(R*v_t)$, $(r_\omega*v_t)$ and $(r_{2\omega}*v_t)$, and may reproduce information written in the recording medium 100 according to the obtained information.

Figure 6:
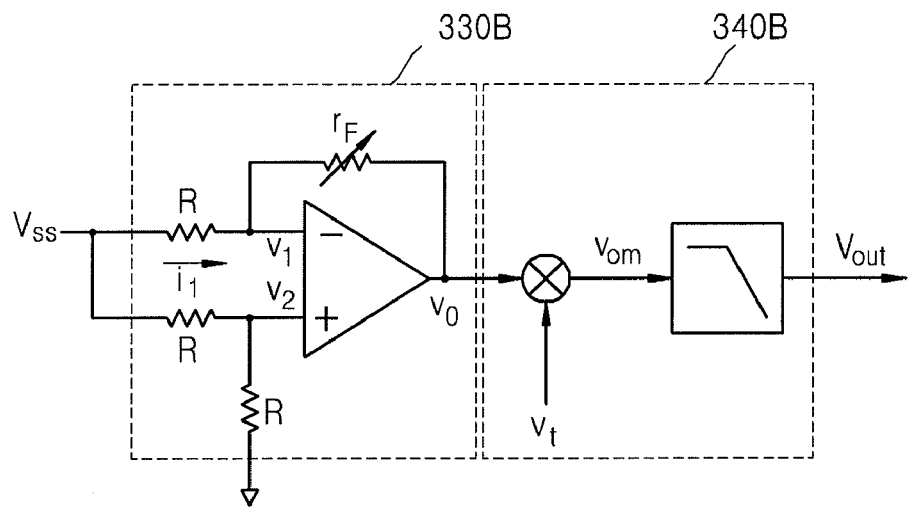
FIG. 6 is a circuit diagram of a modified version of the read unit and the demodulation unit illustrated in FIG. 3, according to another exemplary embodiment.

FIG. 6 is a circuit diagram of a modified version of the read unit 330 and the demodulation unit 340 illustrated in FIG. 3, according to another exemplary embodiment.

As illustrated in FIG. 6, a read unit 330B is embodied using an ideal OP AMP including a closed-loop. Referring to FIG. 6, $r_F$ is a resistance of the channel C, $V_{SS}$ is a given voltage input to the read unit 330B, R is a resistance, $i_1$ is a current flowing through the resistance R connected to a non-inverting terminal of the OP AMP, $v_1$ is a voltage of a non-inverting terminal of the OP AMP and $v_o$ is the voltage signal determined according to the electric field variation (more specifically, the electric field variation transition) detected by the detection unit 320 as described above.

As illustrated in FIG. 6, a demodulation unit 340B demodulates $v_o$ by using the modulation signal $v_t$, performs LPF with respect to the demodulation result $v_{om}$, and determines information written in the recording medium 100 according to a result $v_{out}$ of the LPF.

In particular, $v_1$, $v_2$, $v_o$, $v_{om}$ and $v_{out}$, as illustrated in FIG. 6, are each given by Equation 4 as follows.

$$v_2 = \frac{1}{2}V_{ss} \quad (4)$$

$$v_1 = v_2$$

$$i_1 = \frac{V_{ss} - v_2}{R} = \frac{V_{ss}}{2R}$$

$$v_1 = r_F i_1 + v_o$$

$$v_o = v_1 - r_F i_1$$

$$= -\frac{r_F - R}{2R}V_{ss}$$

$$v_{om} = -\frac{V_{ss}}{2R}[r_0 - R + r_\omega + r_{2\omega}]v_t,$$

where $r_o$ is a DC component of $r_F$, and $r_{2\omega}$ is a component having a frequency 2ω that is twice the frequency ω of the modulation signal, extracted from among the components of $r_F$. In components $v_{om}$, $(r_o*v_t)$ has only a component of ω, $(R*v_t)$ has only a component of ω, $(r_\omega*v_t)$ has only a DC component and a component of 2ω, and a DC component of $(r_{2\omega}*v_t)$ has only components of ω and 3ω.

Thus, a demodulation unit 340B may perform LPF with respect to the demodulation result $v_{om}$ to extract only a DC component from the demodulation result $v_{om}$. That is, the demodulation unit 340A may perform LPF with respect to the demodulation result $v_{om}$ to obtain only information regarding $(r_\omega*v_t)$ from among information regarding $(r_o*v_t)$, $(R*v_t)$, $(r_\omega*v_t)$ and $(r_{2\omega}*v_t)$, and may reproduce information written in the recording medium 100 according to the obtained information.

Figure 7:
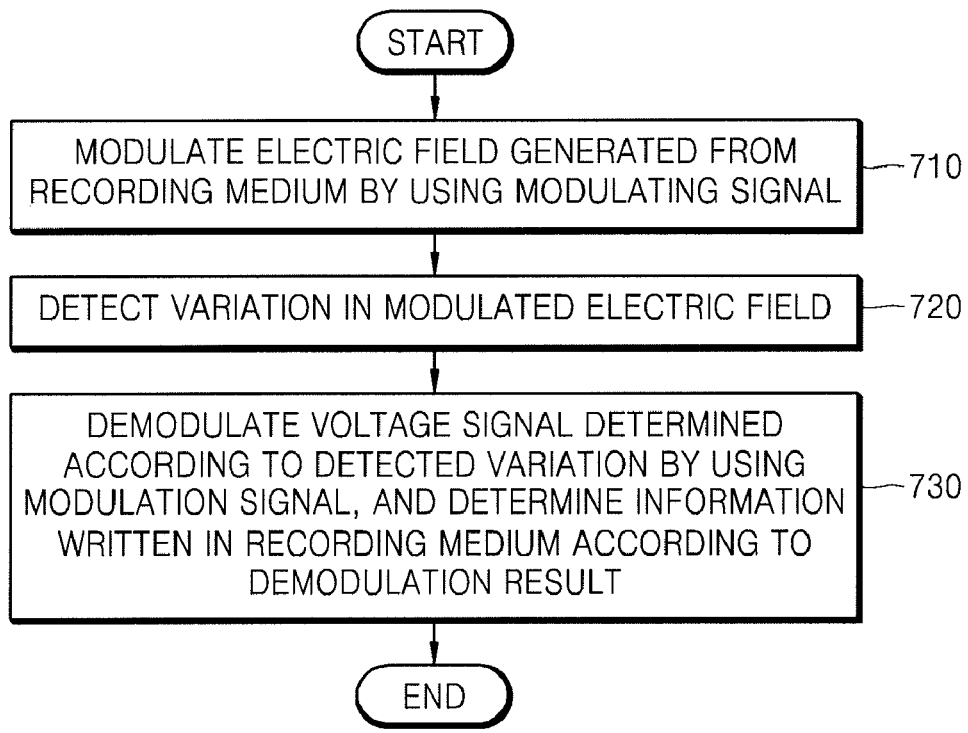
FIG. 7 is a flow chart of an electric field read/write method, according to an exemplary embodiment.

FIG. 7 is a flow chart of an electric field read/write method, according to an exemplary embodiment. The method according to the present exemplary embodiment may include correctly detecting a resistance of a channel, which varies according to an electric field generated from a recording medium in which information is written by an electric field, to correctly reproduce information written in the recording medium (operations 710 through 730). The method of FIG. 7 will be described with reference to FIGS. 1, 2A, 2B, and 3.

The modulation unit 310 modulates an electric field generated from the recording medium 100 by using a given modulation signal (operation 710).

Next, the detection unit 320 detects a variation in the modulated electric field (operation 720). In particular, the detection unit 320 detects a variation in the resistance of the channel C occurring due to the modulated electric field.

The demodulation unit 340 then demodulates a voltage signal determined according to the detected variation by using the modulation signal, and determines information written in the recording medium 100 according to a demodulation result (operation 730).

Computer programs for executing the electric field read/write method according to the exemplary embodiments in a computer can be stored in a computer readable recording medium. Examples of the computer readable recording medium include magnetic storage media (e.g., ROM, floppy disks, hard disks, etc.), and optical recording media (e.g., CD-ROMs, or DVDs). The exemplary embodiments can also be transmitted through a transmission medium, which include carrier waves transmitted through the Internet or various types of communication channel. The computer readable recording medium can also be distributed over network-coupled computer systems so that the computer readable code is stored and executed in a distributed fashion.

While the present invention has been particularly shown and described with reference to exemplary embodiments thereof, it will be understood by one of ordinary skill in the art that various changes in form and details may be made therein without departing from the spirit and scope as defined by the following claims.

What is claimed is:

1. An apparatus for reproducing information written in a recording medium, by using an electric field read head, the apparatus comprising:
    a modulation unit that modulates an electric field variation transition of an electric field generated from the recording medium by using a modulation signal;
    a detection unit that detects a variation transition in the modulated electric field; and
    a demodulation unit that demodulates a voltage signal containing information regarding the variation transition in the modulated electric field and determined according to the detected variation transition by using the modulation signal, and determines information written in the recording medium according to a result of the demodulation,
    wherein the electric field read head comprises a writing electrode for writing the information to the recording medium, wherein the modulation signal is applied to the writing electrode to reproduce the information from the recording medium, and
    wherein the detection unit is disposed inside of the electric field read head.

2. The apparatus of claim 1, wherein the detection unit detects the variation transition in the modulated electric filed by detecting a variation transition in a resistance of a channel of the electric field read head that occurs due to the modulated electric field; and
    wherein the voltage signal is determined according to the detected variation transition in the resistance of the channel of the electric field read head.

3. The apparatus of claim 1, wherein the electric field variation transition is an electric field value based on a time sequence.

4. The apparatus of claim 3, wherein the variation transition of the modulated electric field is detected as a variation transition in a resistance of a channel of the electric field head that occurs due to the modulated electric field.

5. The apparatus of claim 1, further comprising a read unit that includes the electric field read head, and receives a voltage to output the voltage signal to the demodulation unit so that the voltage signal is demodulated by the demodulation unit.

6. The apparatus of claim 1, wherein the modulation unit adjusts a thickness of a channel of the electric field read head with respect to change in carrier distribution in the channel.

7. The apparatus of claim 1, wherein a frequency of the modulation signal is higher than a frequency of the electric field generated from the recording medium.

8. The apparatus of claim 1, wherein the demodulation unit performs low pass filtering with a filter coefficient with respect to a result of the demodulation, and determines the information written in the recording medium according to a result of the low pass filtering.

9. The apparatus of claim 1, wherein the demodulation unit removes an offset contained in a result of the demodulation, and determines the information written in the recording medium according to a result of the removing the offset.

10. A method of reproducing information written in a recording medium, by using an electric field read head, the method comprising:
    modulating an electric field variation transition of an electric field generated from the recording medium by using a modulation signal;
    detecting a variation transition in the modulated electric field; and
    demodulating a voltage signal containing information regarding the variation transition in the modulated electric field and determined according to the detected variation transition by using the modulation signal; and
    determining information written in the recording medium according to a result of the demodulating,
    wherein the electric field read head comprises a writing electrode for writing the information to the recording medium, wherein the modulation signal is applied to the writing electrode to reproduce the information from the recording medium, and
    wherein the variation transition of the modulated electric field is detected inside of the electric field read head.

11. The method of claim 10, wherein the detecting comprises detecting a variation transition in a resistance of a channel of the electric field read head that occurs due to the modulated electric field; and
    wherein the voltage signal is determined according to the detected variation transition in the resistance of the channel of the electric field read head.

12. The method of claim 10, wherein the electric field variation transition is an electric field value based on a time sequence.

13. The method of claim 12, wherein the variation transition of the modulated electric field is detected as a variation transition in a resistance of a channel of the electric field read head that occurs due to the modulated electric field.

14. The method of claim 10, wherein a frequency of the modulation signal is higher than a frequency of the electric field generated from the recording medium.

15. The method of claim 10, wherein the modulating comprises adjusting a thickness of a channel of the electric field head with respect to change in carrier distribution in the channel.

16. The method of claim 10, wherein the demodulating comprises performing low pass filtering with a given filter coefficient with respect to a result of the demodulation, and determining the information written in the recording medium according to a result of the low pass filtering.

17. The method of claim 10, wherein the determining comprises removing an offset contained in a result of the demodulating, and determining the information written in the recording medium according to a result of the removing the offset.

18. An apparatus for reproducing information written in a recording medium, by using an electric field read head, the apparatus comprising:

a modulation unit that modulates an electric field variation transition of an electric field generated from the recording medium by using a modulation signal;

a detection unit that detects a variation transition in the modulated electric field; and a demodulation unit that demodulates a voltage signal containing information regarding the variation transition in the modulated electric field and determined according to the detected variation transition by using the modulation signal, and determines information written in the recording medium according to a result of the demodulation, wherein the detection unit is disposed inside of the electric field read head.

* * * * *